United States Patent [19]

Cook

[11] 4,159,504
[45] Jun. 26, 1979

[54] SITE ASSEMBLED ELECTRICAL LOAD CENTER

[75] Inventor: David L. Cook, Christchurch, New Zealand

[73] Assignee: Square D Company, Park Ridge, Ill.

[21] Appl. No.: 913,983

[22] Filed: Jun. 9, 1978

Related U.S. Application Data

[63] Continuation-in-part of Ser. No. 784,882, Apr. 5, 1977, abandoned.

[51] Int. Cl.² .............................................. H02B 1/04
[52] U.S. Cl. .................................. 361/361; 361/363; 361/355; 174/68 B
[58] Field of Search ................ 174/68 B, 70 B, 99 B, 174/149 B; 339/198 N; 361/346, 353, 355, 356, 358, 361, 363

[56] References Cited
U.S. PATENT DOCUMENTS

| 2,902,632 | 9/1959 | Stanback | 361/361 |
| 2,985,710 | 5/1961 | Davis | 361/361 |
| 3,096,131 | 7/1963 | Adams | 174/68 B |
| 3,848,161 | 11/1974 | Clement | 174/70 B |

Primary Examiner—Gerald P. Tolin
Attorney, Agent, or Firm—Larry I. Golden; Richard T. Guttman; Norton Lesser

[57] ABSTRACT

An electrical load center comprising an enclosure having a bus bar assembly extending longitudinally thereof, and the bus bars being mounted on an insulated base. A pair of end base plates support the bus bar assembly, the end base plates being formed of insulating material and mounted in the enclosure at respective ends of the bus bar assembly to receive a selected one of a plurality of terminal support means, terminal barriers or cover plates.

12 Claims, 13 Drawing Figures

SITE ASSEMBLED ELECTRICAL LOAD CENTER

This is a continuation-in-part of application Ser. No. 784,822, filed Apr. 5, 1977, now abandoned.

BACKGROUND OF THE INVENTION

This invention relates to an electrical load center.

More particularly, the invention relates to an electrical load center which is easily adapted to accomodate a number of different wiring arrangements in combination with a number of different arrangements of plug-in components, such as, for example, circuit breakers and in some cases, non plug-in components, such as earth leakage circuit breakers.

Additionally, a number of electrical load centers of the present invention may be joined together to provide an electrical load center system thus providing a large number of electrical connection and component arrangements.

According to the present invention there is provided an electrical load center comprising an enclosure a bus bar assembly extending longitudinally of said enclosure and comprising bus bars mounted on an insulating base, a pair of end base plates for supporting said bus bar assembly, said base plates being formed of insulating material and mounted in said enclosure at respective ends of said bus-bar assembly, said base plates being adapted to receive a selected one of a plurality of terminal support means, terminal barriers or cover plates.

BRIEF DESCRIPTION OF THE DRAWINGS

Embodiments of the present invention will now be described by way of example with reference to the accompanying drawings in which.

DESCRIPTION OF PREFERRED EMBODIMENT

Figure 1:
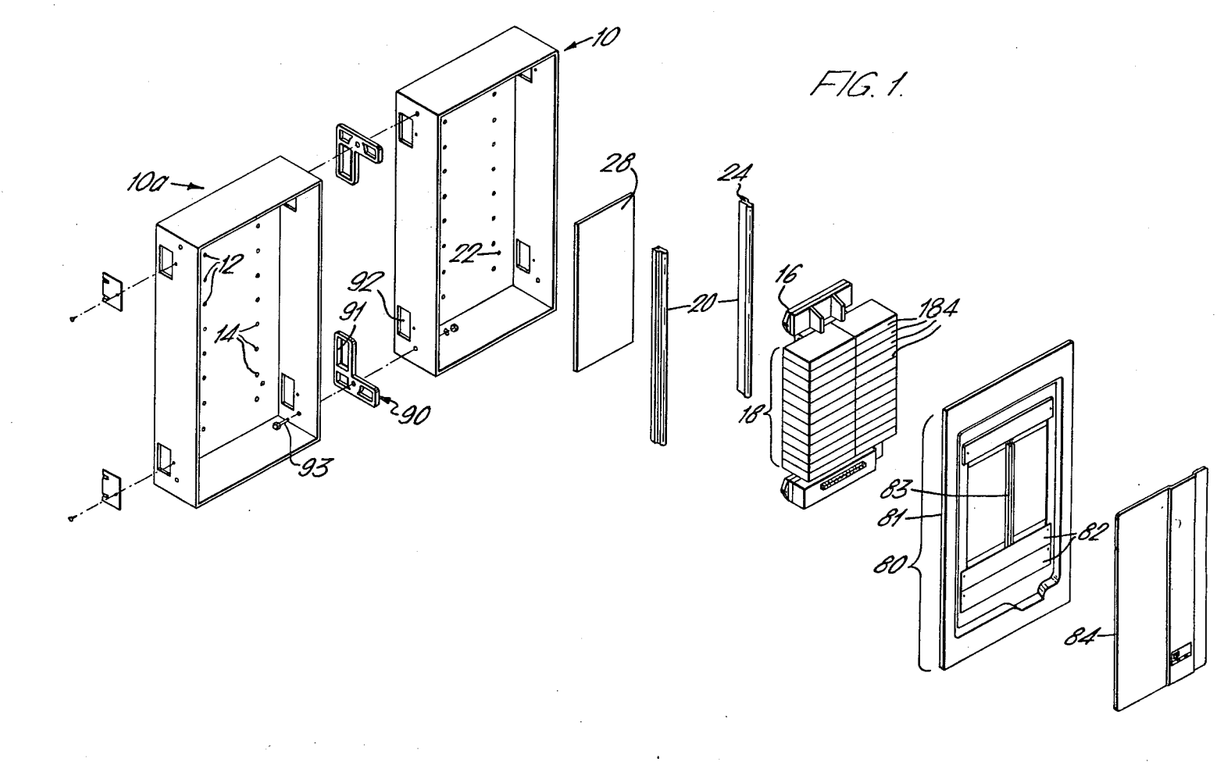
FIG. 1 is an exploded view, in perspective of a load center according to the present invention.
Figure 2:
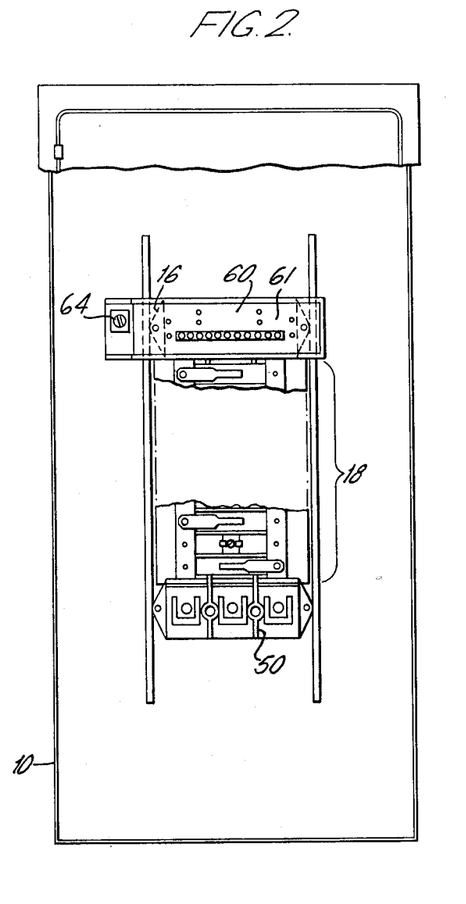
FIGS. 2 and 3 are elevational views of examples of load centers constructed in accordance with the present invention.
Figure 3:
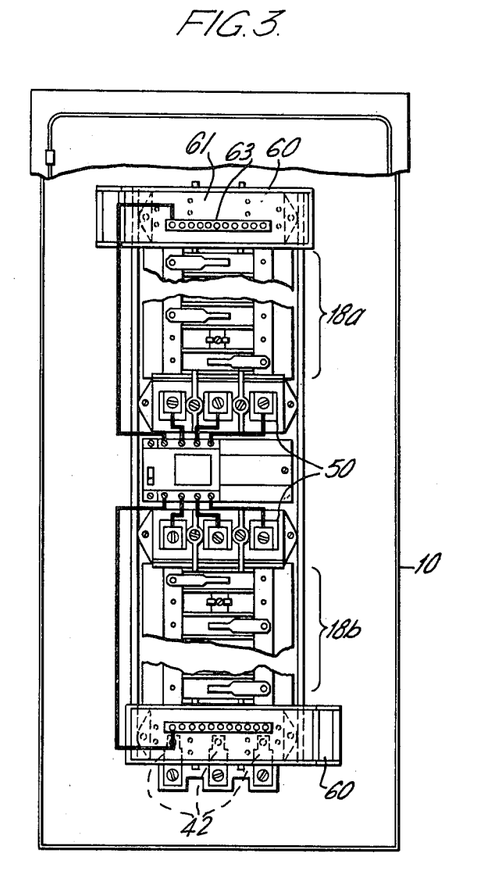

Referring to FIG. 1 of the drawings, a load center comprises an enclosure or box, 10, the bottom of which is provided with two parallel rows of apertures 12 and 14 (FIG. 2) through which a pair of base plates 16 for supporting a bus bar assembly 18 may be secured to the cabinet or box 10 in a spaced apart relationship depending on a desired bus bar length. A bus bar assembly 18 comprises three parallel bus bars fixed on insulating support members as shown in FIGS. 2 and 3. The length of the assembly depends on the number of components, such as circuit breakers, which will be installed in the load center.

Figures 9, 10, 11:
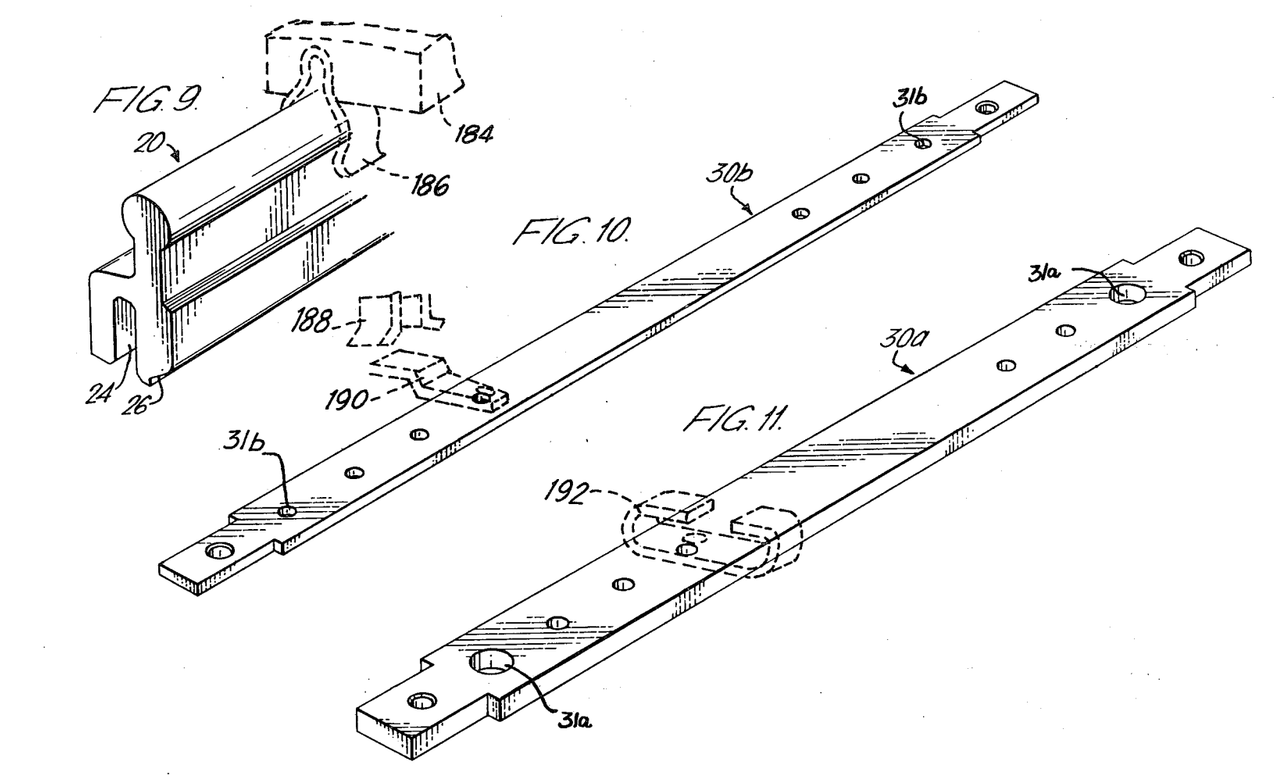
FIG. 9 is an isometric view of a mounting rail.
FIGS. 10 and 11 are respective isometric views view of two types of bus bars respectively.

A pair of mounting rails 20 formed from extruded aluminum are fitted to the box 10 by self-tapping screws which pass through apertures 22 in box 10 and engage a groove 24 formed in the base of each rail 20 (FIG. 10). Each rail 20 is also provided with rabbett 26 which serve to locate an insulating sheet 28 between the bus bar assembly 18 and the bottom of the box 10. The pair of mounting rails 20 are adapted to receive electrical components such as circuit breakers in a manner known in the art and described, for example, in U.K. Patent Specification No. 793,885 or U.S. Pat. No. 2,902,632 on which the U.K. specification is based.

Figure 4:
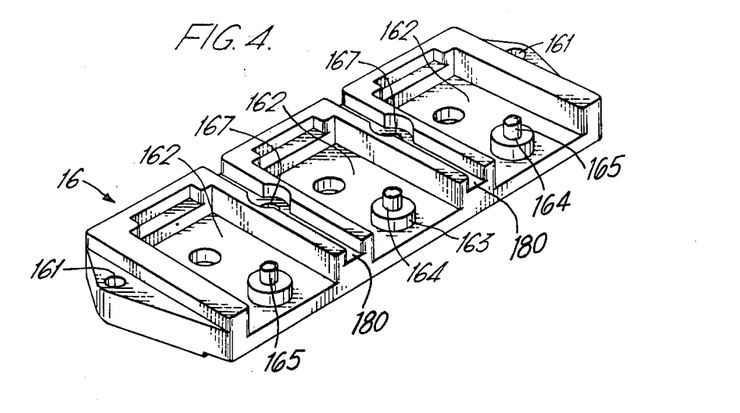
FIG. 4 is an isometric view of a base plate incorporating the principles of the present invention.

Referring now to FIG. 4, a base plate 16 for supporting a bus bar assembly 18 is provided with a pair of apertures 161 through which the base plate 16 is bolted to the box 10 through a respective pair of apertures forming the rows 12 and 14 in the bottom of the box 10.

Figure 12:
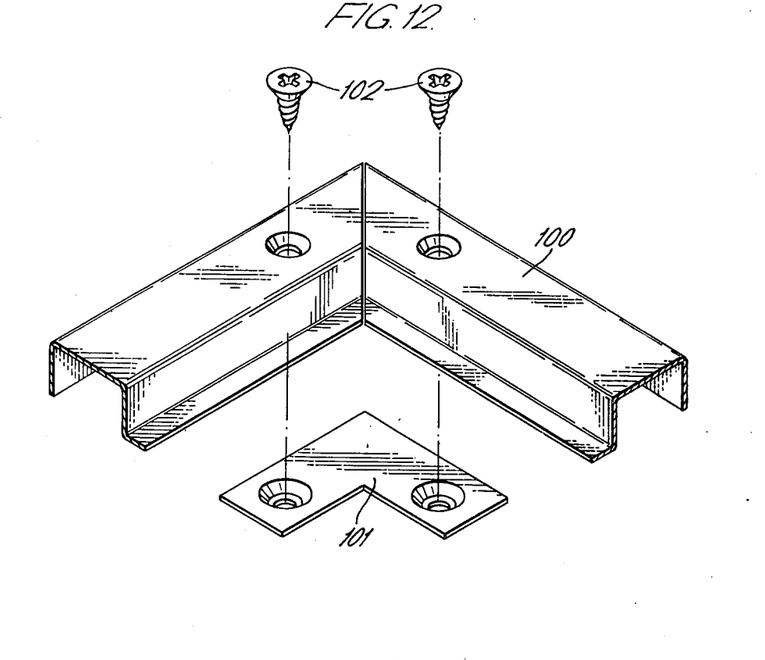
FIG. 12 shows a flush trim kit for use with the load center of the present invention.

Three recesses 162 are adapted to receive the ends of respective bus bars, which cooperate with a boss 163 formed in each of the recesses 162. The bosses 163 each having a central aperture 164 into which a pin 165 (FIG. 4) may be fitted. When 200 amp bus bars 30a (FIG. 12) are used, the ends of the bus bars 30a are provided with apertures large enough to pass over the boss 163 and thus, the bus bar rests on the bottom surface of the recesses 162. When 100 amp bus bars 30b (FIG. 11) are used, the apertures in the ends of the bus bars 30b are large enough to pass over only the pin 165 and the bus bar 30b thus rests on the boss 163. The height of the boss 163 is arranged to be equal to the difference between the thicknesses of the bus bar 30a and the bus bar 30b and thus the top surfaces of the bus bars are at the same level when the bus bar assembly 18 is mounted in the box 10. The base plate 16 is also provided with a pair of apertures 167 through which a selected one of a plurality of terminal support means terminal barriers or covers may be fixed to the base plate 16 to secure the ends of the bus bar assembly 18 ot the respective base plates.

Figure 5:
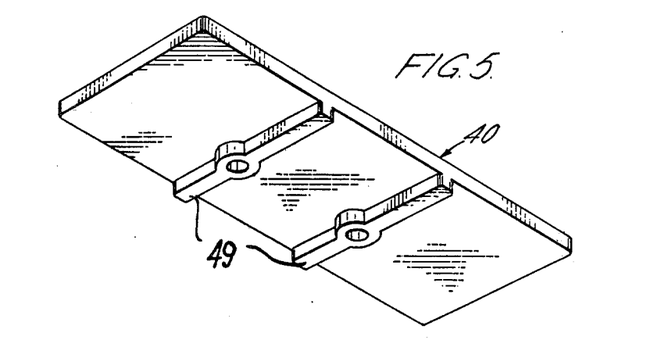
FIG. 5 is an isometric view of a cover member for the base plate of FIG. 4.

FIG. 5 illustrates one example of a cover 40 which can be used where no incoming or outgoing connections are required onto the bus bars, for example, when a main circuit breaker is used and where no neutral terminal assembly is required.

Figure 6:
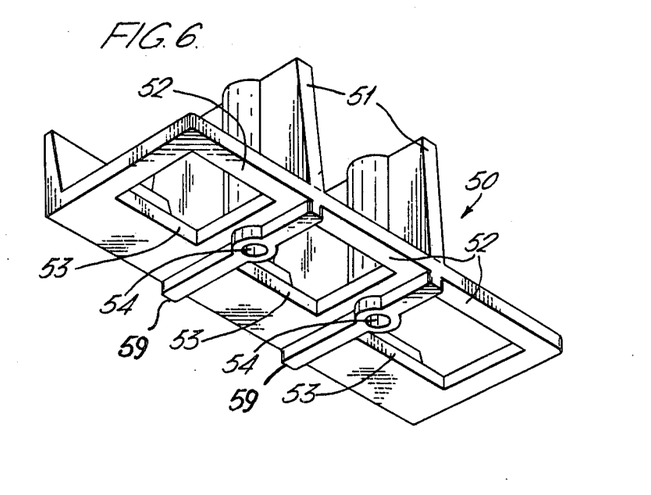
FIG. 6 is an isometric view of a terminal barrier.

FIG. 6 shows a terminal barrier 50 provided with a pair of ribs 51 to define three sections 52 in the barrier. Each section 52 has an aperture 53 through which a terminal or "box lug" contacts its respective bus bar and an aperture 54 is provided in each rib 51 to cooperate with the apertures 167 of the base plate 16.

Figure 7:
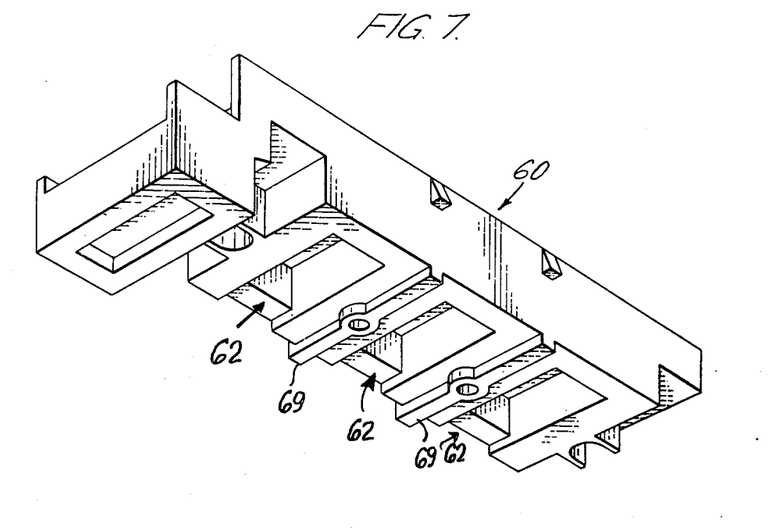
FIG. 7 is an isometric view of terminal support means in the form of a neutral support.
Figure 8:
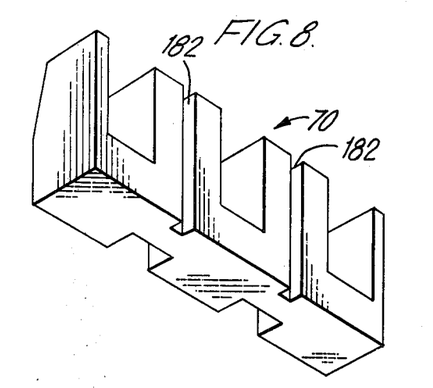
FIG. 8 is an isometric view showing a terminal support for use with the neutral support of FIG. 7.

FIG. 7 shows terminal support means in the form of a neutral support 60. Referring particularly to FIGS. 2 and 3, the neutral support 60 is adapted to receive a neutral bar 61 to which outgoing neutral terminals 63 and incoming "box lugs" 64 are fitted as desired. To allow for through bus extension connecting, beneath the neutral terminal assembly for example, to another load center, the neutral support 60 is provided with recesses which permit the addition of extension links, item 42 on FIG. 3, which project beyond the neutral support and accept 100 amp terminal lugs and for which a terminal support 70, such as, for example, that shown in FIG. 8, may be fitted.

In the example shown in FIG. 2, one end of the bus bar assembly 18 is fitted to a base plate 16 having a neutral support 60 and the other end of the assembly 18 is fitted to a base plate 16 having a terminal barrier 50, to form a single unit. This unit may be removed and refitted to the box 10 to allow fitting of the box to a wall.

In FIG. 3 a load center 10 has two bus bar assemblies 18a and 18b each mounted on a pair of base plates 16 having respectively a terminal barrier 50 and a neutral support 60.

The load center of the present invention is closed off by means of a cover assembly 80 comprising a cover plate 81 having a large aperture. A desired number of trim plates 82 and central rib 83 define within the large aperture an opening as required. An example of a cover assembly is shown in Photograph 7. A door 84 may be fitted to the cover plate 81.

A number of load centers according to the present invention may be joined together to form a load center system. In FIG. 1, wherein two load centers 10 and 10a are bolted together, a generall L-shaped spacer member 90 is used. The longer leg of the spacer member 90 is provided with a lipped aperture 91 having rounded edges and corners which act as a grommet to protect wire connectors between adjacent load centers. The lipped aperture 91 locates in a corresponding aperture 92, in the box 10. The lip of aperture 91 may be provided on one or both faces fo the spacer member 90. Adjacent load centers are bolted together by a single screw 93 through each spacer 90.

Figure 13:
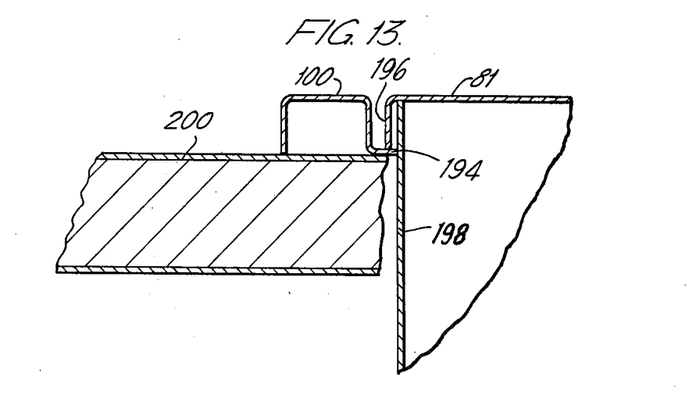
FIG. 13 is a sectional view illustrating the flush trim and an adjacent wall section.

FIG. 13 shows a flush trim kit comprising extruded longitudinal sections 100 and corner members 101. The sections 100 and corners 101 are fitted together to form a frame surrounding the load center or load center system. The frame is located against the wall by the cover plate 81 secured to the front of the box 10.

It will be seen that the base or support member 16 is provided with parallel elongate recesses 180 in the upper surface having an enlarged transverse recess formed adjacent aperture 167. A predetermined configuration is thus provided for the base for nesting engagement with ribs or bosses 49 of corresponding shape or complementary configuration on the cover or plate 40. Similar bosses 59 on the barrier members 50 provide a complementary shape for recesses 180 to enable the barrier member to alternatively engage the base. Alternatively the terminal support means 60 having ribs or bosses 69 of corresponding of complementary shape to the recesses 180 may be fitted to the base plate 40. Screws passing through apertures in the respective members and the plate 16 serve to secure the members. The insulating sheet 28 is sandwiched or secured between the rails 20 which are received beneath the neutral support. The neutral support 60 has ribs on the rear surface thereof for nesting engagement with correspondingly shaped recesses 182 in the terminal support 70 to locate the terminal support and links 42 extend from the bus bars through recesses 186 in the neutral support to the terminal support, where a box terminal is secured thereto.

In FIGS. 9–11 relevant portions of a typical circuit breaker 184 having an insulated spring clip 186 at one end for engaging the mounting rail 20 is indicated by dashed lines. The breaker has a clip terminal 188 adjacent the other end for engaging a connector 190 shown by dashed lines extending from a contact or upper surface of one side bar to a position overlapping a center bus bar. Alternatively the terminal 188 engages a connector or branch center 192 indicated by broken lines mounted on a center bus bar. Whether bus bars 30a or 30b are used in the assembly the bus connectors 190 or 192 will be at the same relative positions since one wide face of the thick bus bars 30a with which respective connectors are engaged will be in a selected plane or occupy a parallel coplanar position to that of one wide face of thinner bus bars 30b if bus bars 30b are to be used in place of bars 30a.

The frame formed by sections 100 has a flange 194 overlapped and engaged by a lip 196 on the cover plate 81 secured to the cabinet or box 10. Lip 196 extends adjacent the rim wall 198 of the cabinet for holding the frame against adjacent wall section 200 to camouflage the wall.

I claim:

1. An electrical load center assembly including a plurality of elongate bus bars of rectangular cross section, each of said bus bars having a first wide surface and a second wide surface parallel to said first wide surface, each bus bar of said plurality having its said first wide surface spaced from its said second wide surface by either a first distance or by a second and lesser distance, the first distance bus bars being called first bus bars and the second distance bus bars being called second bus bars, the improvement comprising;

a pair of spaced apart insulating support members, each of said support members having respective first support means integrally formed thereon for engaging with said first wide surface of each of said first bus bars and for supporting said first bus bars at spaced positions with the second wide surface of each bus bar of said first bus bars located in a common plane to form coplanar contact surfaces in said common plane;

respective second support means integrally formed on each of said insulating support members for engaging with said first wide surface of each of said second bus bars and for supporting said second bus bars at spaced positions with said second wide surface of each bus bar of said second bus bars located in said common plane to form coplanar contact surfaces located in said common plane; and means for locating each of said support members in a fixed position relative each other support member with the first support means of each member located in a selected plane and for engaging with said first wide surface of each bus bar of said first bus bars to locate the second wide surface of each bus bar of said first bus bars in said common plane and said second support means of each member located in another selected plane and for engaging with said first wide surface of each bus bar of said second bus bars to locate the second wide surface of each bus bar of said second bus bars in said common plane.

2. The assembly claimed in claim 1 in which each said second support means includes a respective first planar surface and each said first support means includes a second planar surface spaced from the first planar surface by a distance corresponding to the difference in distance between said first distance and said second distance, and said assembly includes a transverse boundary wall portion transverse to said first planar surface and said second planar surface.

3. The assembly claimed in claim 2 in which each first bus bar has an aperture of a first size and each second bus bar has an aperture of a second size, and said second support means comprises a boss received in said aperture of said first size and corresponding in height to the difference between said first distance and said second distance.

4. The assembly claimed in claim 3 in which said second support means includes an aperture in said boss receiving a pin which is fittingly received by said aperture of said second size in said second bus bar.

5. The assembly claimed in claim 2 in which said assembly includes a cabinet having a planar metal back wall, a pair of spaced rail members each having a longitudinally extending groove and supporting one end of a circuit breaker connected to one of said bus bars, securing means engaged with said back wall and in said groove for securing each of said rails to said metal wall, and a planar insulating sheet interposed between said bus bars and said metal wall in continuous engagement with said metal wall between said spaced rail members and captured between said metal wall and said rail members.

6. In the assembly claimed in claim 5 a predetermined eccentric configuration for each of said insulating support members formed in said transverse boundary wall portion, and a terminal barrier having a complementary configuration to said predetermined eccentric configuration in nested engagement with the predetermined configuration formed in the boundary wall portion of a selected one of said support members.

7. In the assembly claimed in claim 6, means on said terminal barrier for receiving a 100 amp. terminal for each bus bar and a 200 amp. terminal for each bus bar.

8. In the assembly claimed in claim 6 a neutral terminal assembly having a configuration complementary to the predetermined eccentric configuration formed in the boundary wall portion of said support members in nested engagement with the predetermined configuration formed in the boundary wall portion of a selected one of said support members.

9. The assembly claimed in claim 6 including a bus connector, and a bus branch center engaging selected ones of said coplanar bus bar surfaces and adapted to engage a spring terminal on a respective circuit breaker.

10. The assembly claimed in claim 5 in which said metal wall has a peripheral rim wall with spaced passages and is positioned adjacent another rim wall, and insulating means interposed between adjacent rim walls and having first passages for securing the rim walls in adjacent spaced positions and second passages aligned with the rim wall passages for passing an electrical connection through said rim walls.

11. In the assembly claimed in claim 10 a flush trim kit for use in camouflaging an adjacent wall comprising extended longitudinal sections, corner members engaging the ends of transversely extending longitudinal sections to form a frame for one rim wall, and a cover plate secured to said rim wall and having a flange overlapping said rim wall to engage said sections to secure said frame against said adjacent wall.

12. The assembly claimed in claim 8 in which said neutral terminal assembly includes means for receiving a link connected to a selected bus bar, and a terminal support for supporting a terminal connected to said link.

* * * * *